US00RE46169E

(19) United States
(12) Reissued Patent
Kelly et al.

(10) Patent Number: US RE46,169 E
(45) Date of Reissued Patent: Oct. 4, 2016

(54) UNIFIED IMAGE DISPLAY FOR A VIDEO TERMINAL INCLUDING A GAMING MACHINE

(71) Applicant: Bally Gaming, Inc., Las Vegas, NV (US)

(72) Inventors: Bryan Kelly, Alamo, CA (US); Martin Lyons, Las Vegas, NV (US)

(73) Assignee: BALLY GAMING, INC., Las Vegas, NV (US)

(21) Appl. No.: 29/532,742

(22) Filed: Jul. 9, 2015

Related U.S. Patent Documents

Reissue of:

(64) Patent No.: Des. 646,337
Issued: Oct. 4, 2011
Appl. No.: 29/368,519
Filed: Aug. 25, 2010

U.S. Applications:

(63) Continuation-in-part of application No. 12/827,527, filed on Jun. 30, 2010, now abandoned, and a continuation-in-part of application No. 29/364,934, filed on Jun. 30, 2010, now Pat. No. Des. 646,336.

(51) LOC (10) Cl. ..... 21-03

(52) U.S. Cl.
USPC ..... D21/370; D21/329

(58) Field of Classification Search
USPC ..... D21/324–331, 369–371, 385; D14/125–129, 336, 341, 371–376; D20/10; 273/274, 292; 463/16–17, 20, 463/31, 46–47
CPC .... A63F 13/08; G07F 17/32; G07F 17/3202; G07F 17/3211; G07F 17/3216
See application file for complete search history.

(56) References Cited

U.S. PATENT DOCUMENTS

D405,473 S * 2/1999 Tikhonski et al. ..... D20/42
6,334,612 B1 * 1/2002 Wurz ..... G07F 17/3216 273/143 R (Continued)

OTHER PUBLICATIONS

Alpha 2 Pro V22/22 Hardware Specifications, Bally Gaming, Inc., Dated 2010, 2 color pages.

(Continued)

*Primary Examiner* — Darlington Ly
(74) *Attorney, Agent, or Firm* — Banner & Witcoff, Ltd.

(57) CLAIM

The ornamental design for the unified image display for a video terminal including a gaming machine, as shown and described.

DESCRIPTION

FIG. 1 is a front-side perspective view of the display according to the present invention showing an example of content displayed thereon;
FIG. 2 is a front view of the display of FIG. 1 *with the environmental graphical user interface removed for clarity*;
FIG. 3 is a right side view of the display of FIG. 1:
FIG. 4 is a left side view of the display of FIG. 1;
FIG. 5 is a rear view of the display of FIG. 1; [and,]
FIG. 6 is a top view of the display of FIG. 1[,] *with the environmental graphical user interface removed for clarity; and,*
*FIG. 7 is the front-side perspective view of the display of FIG. 1 with the environmental graphical user interface removed for clarity.*
The broken lines showing [portions of a] *the environmental graphical user interface in FIG. 1 and the remainder of the* terminal cabinet [to support the display of the present invention] in FIGS. 1-[6] *7* are *provided* for [illustrative] *the* purposes [only] *of illustrating the environmental structure* and form no part of the claimed design.

1 Claim, 7 Drawing Sheets

Figure 2:
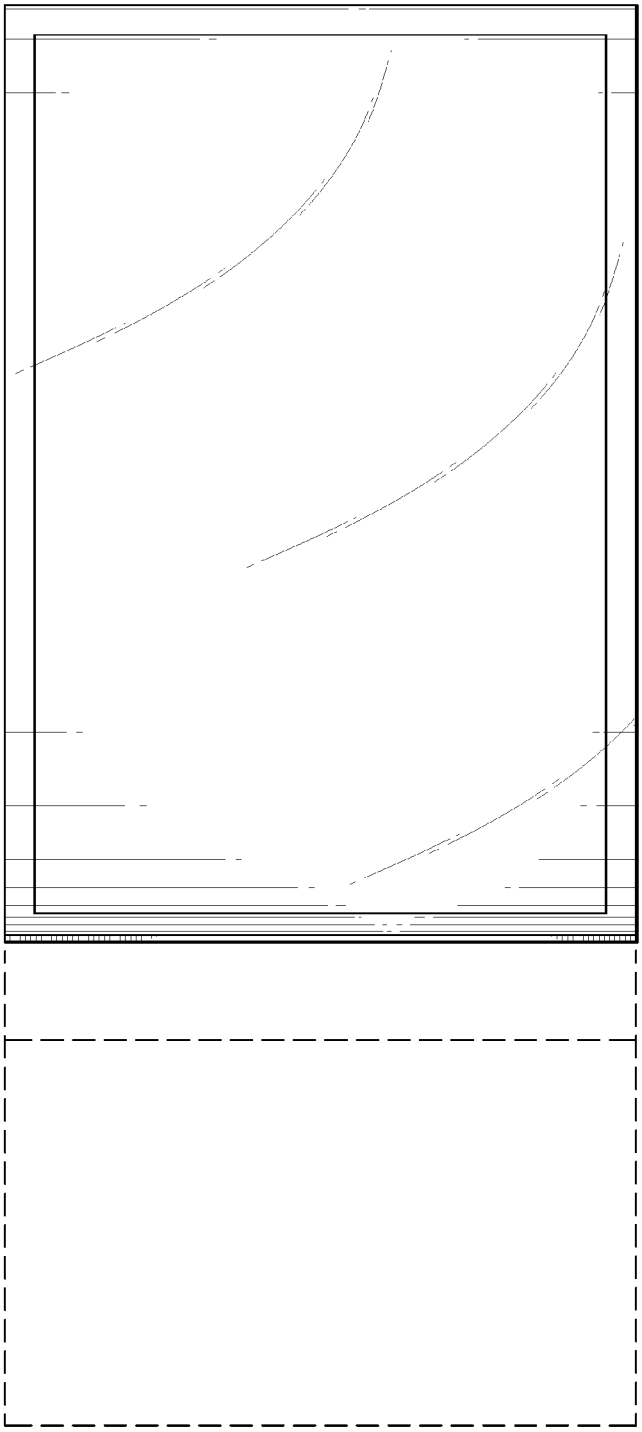
Figure 3:
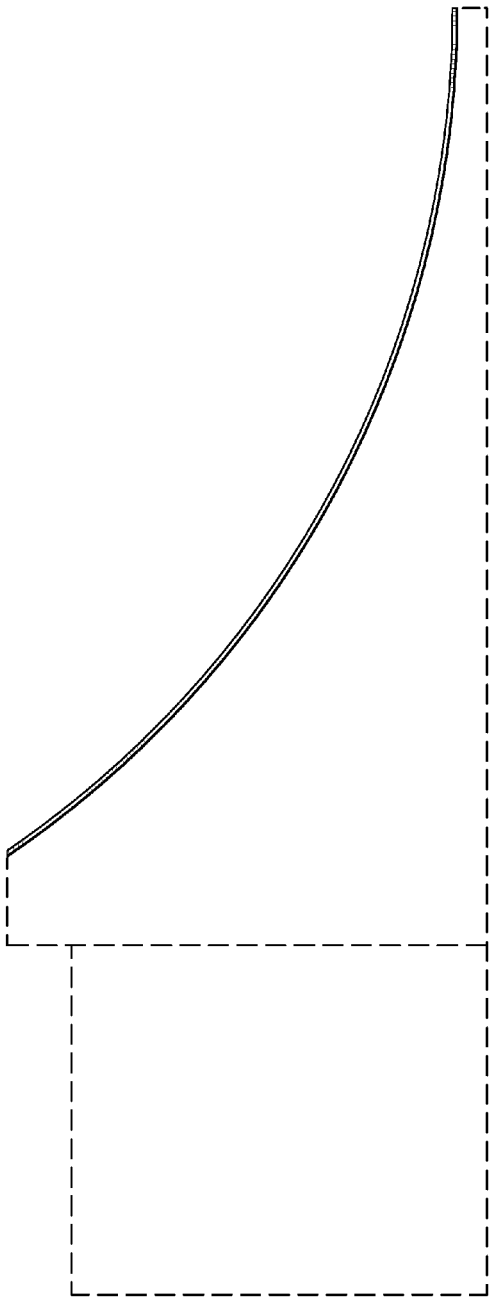
Figure 4:
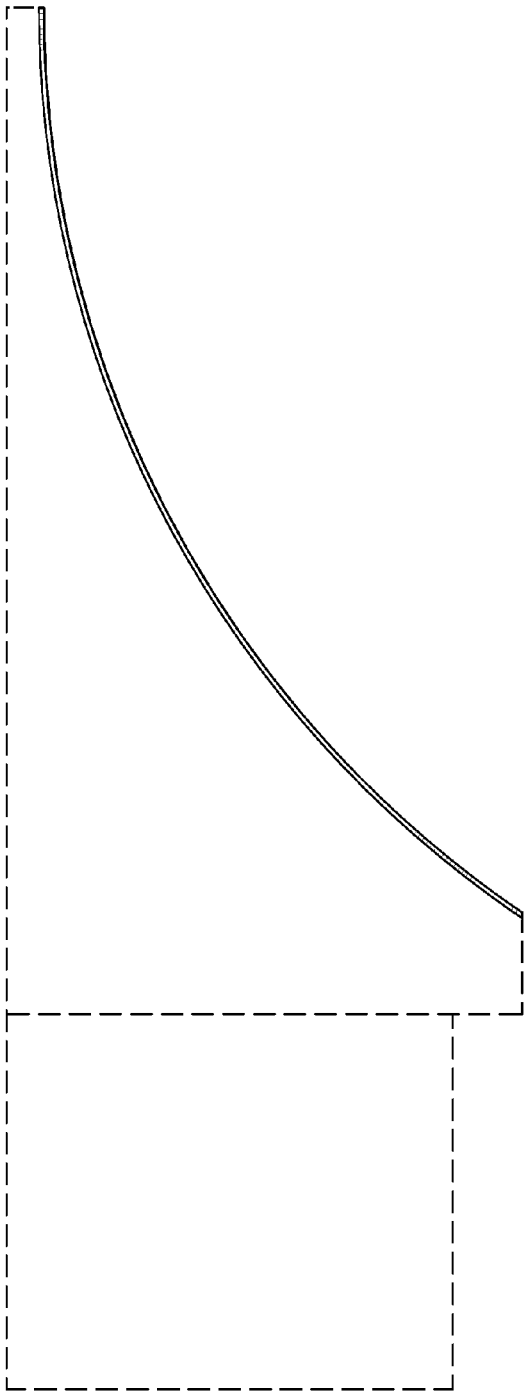
Figure 5:
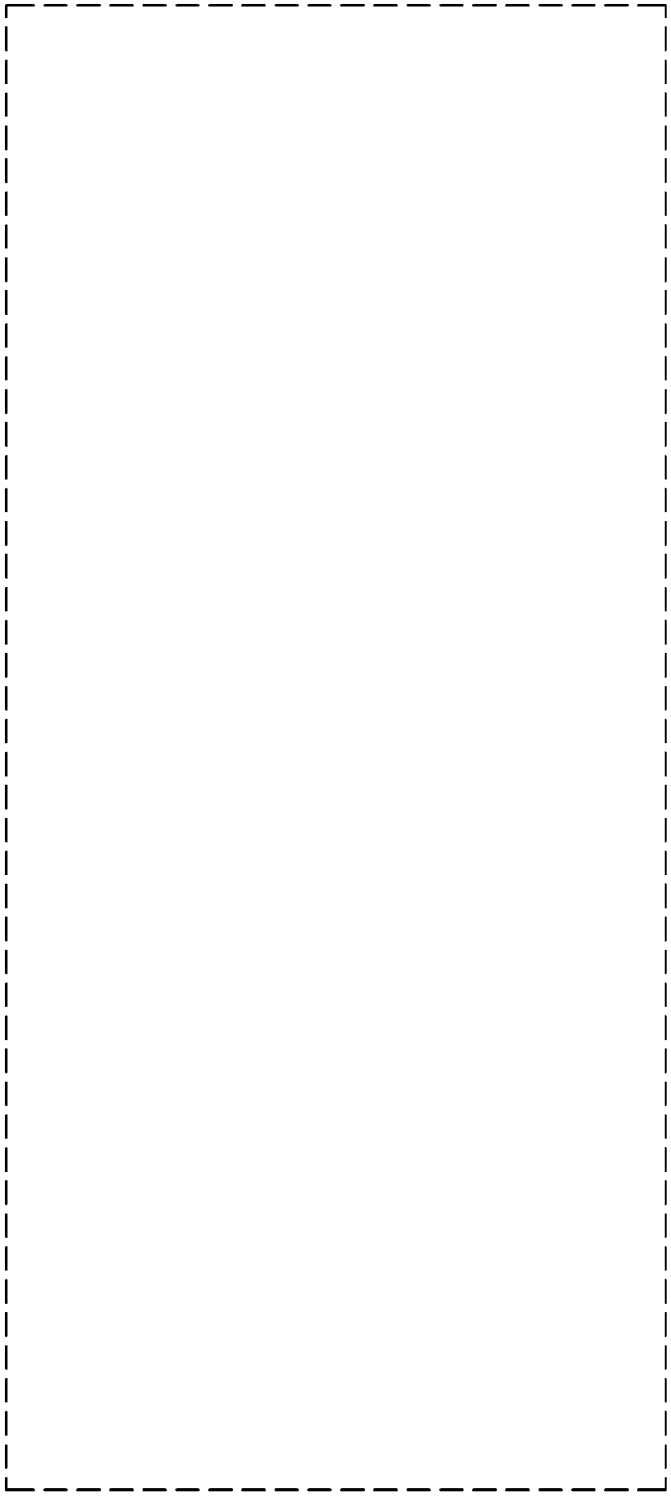
Figure 6:
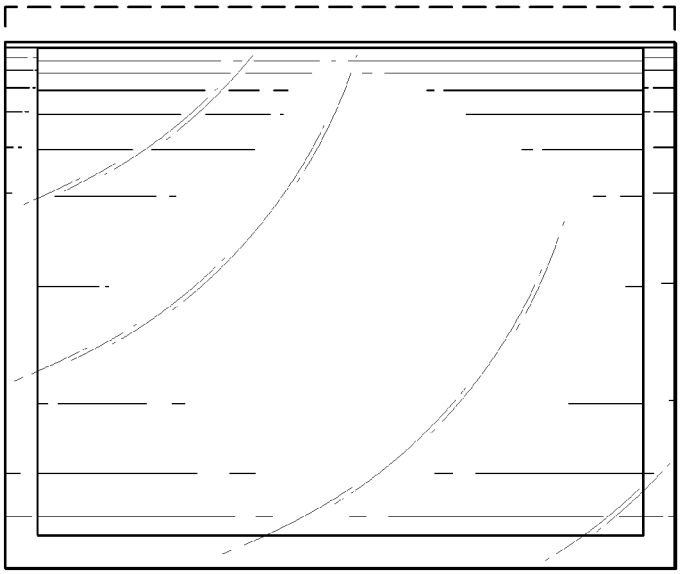

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D465,813 | S | * | 11/2002 | Randall | D21/370 |
| D481,078 | S | * | 10/2003 | Stephan | D21/369 |
| D484,548 | S | * | 12/2003 | Franco Munoz et al. | D21/370 |
| D485,583 | S | * | 1/2004 | Porto | D21/369 |
| 6,729,618 | B1 | * | 5/2004 | Koenig et al. | 463/20 |
| D492,365 | S | * | 6/2004 | Munoz et al. | D21/370 |
| D508,961 | S | * | 8/2005 | Gatto et al. | D21/325 |
| D549,785 | S | * | 8/2007 | Luciano et al. | D21/370 |
| D560,724 | S | * | 1/2008 | Johnson | D21/370 |
| D600,696 | S | * | 9/2009 | Andre | D14/371 |
| D604,368 | S | * | 11/2009 | Lesley | D21/370 |
| D604,774 | S | * | 11/2009 | De Viveiros Ortiz | D21/325 |
| 7,628,693 | B2 | * | 12/2009 | Thomas | 463/20 |
| D615,598 | S | * | 5/2010 | McComb et al. | D21/370 |
| D618,682 | S | * | 6/2010 | Haase | D14/371 |
| D622,781 | S | * | 8/2010 | Lesley | D21/369 |
| D631,046 | S | * | 1/2011 | Chien | D14/371 |
| D633,950 | S | * | 3/2011 | Terpstra | D21/369 |
| D649,605 | S | * | 11/2011 | Terpstra | D21/370 |
| D685,033 | S | * | 6/2013 | Wudtke | D21/370 |
| 8,641,535 | B2 | * | 2/2014 | McComb | A63F 13/08 463/48 |
| D712,975 | S | * | 9/2014 | Lesley | D21/369 |
| D719,616 | S | * | 12/2014 | Inoue | D21/370 |
| D733,088 | S | * | 6/2015 | Garneau | D14/172 |
| D742,975 | S | * | 11/2015 | Myers | D21/370 |
| D743,363 | S | * | 11/2015 | Yokota | D14/126 |
| D744,579 | S | * | 12/2015 | Cope | D16/241 |
| D747,718 | S | * | 1/2016 | Drabant | D14/371 |
| 2003/0069070 | A1 | | 4/2003 | Alcorn et al. | |

OTHER PUBLICATIONS

2009 Product Catalog. Published by Bally Technologies, Inc. Las Vegas, Nevada, USA.

2008 Product Catalog. Published by Bally Technologies, Inc. Las Vegas, Nevada, USA.

* cited by examiner

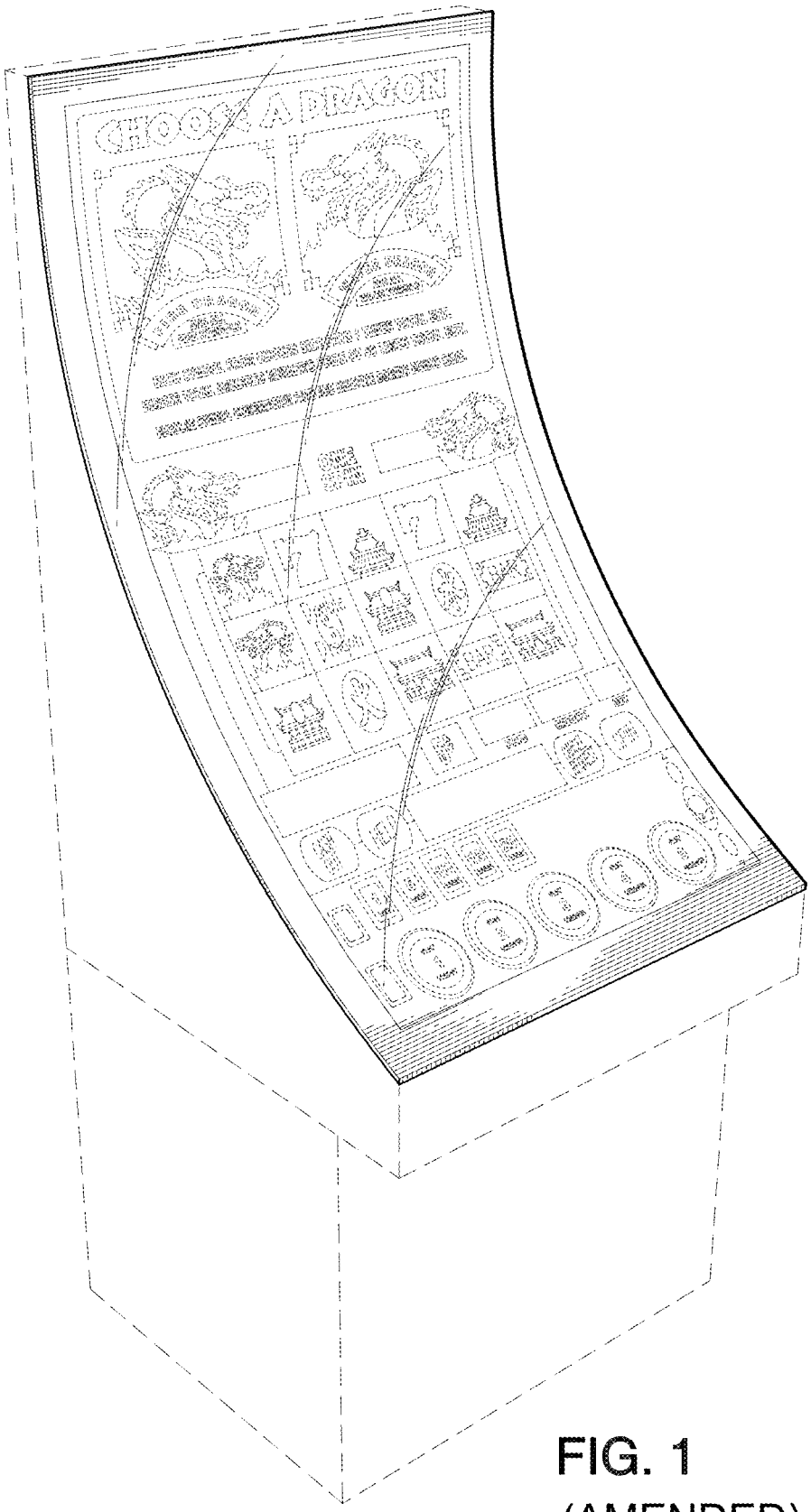
FIG. 1
(AMENDED)

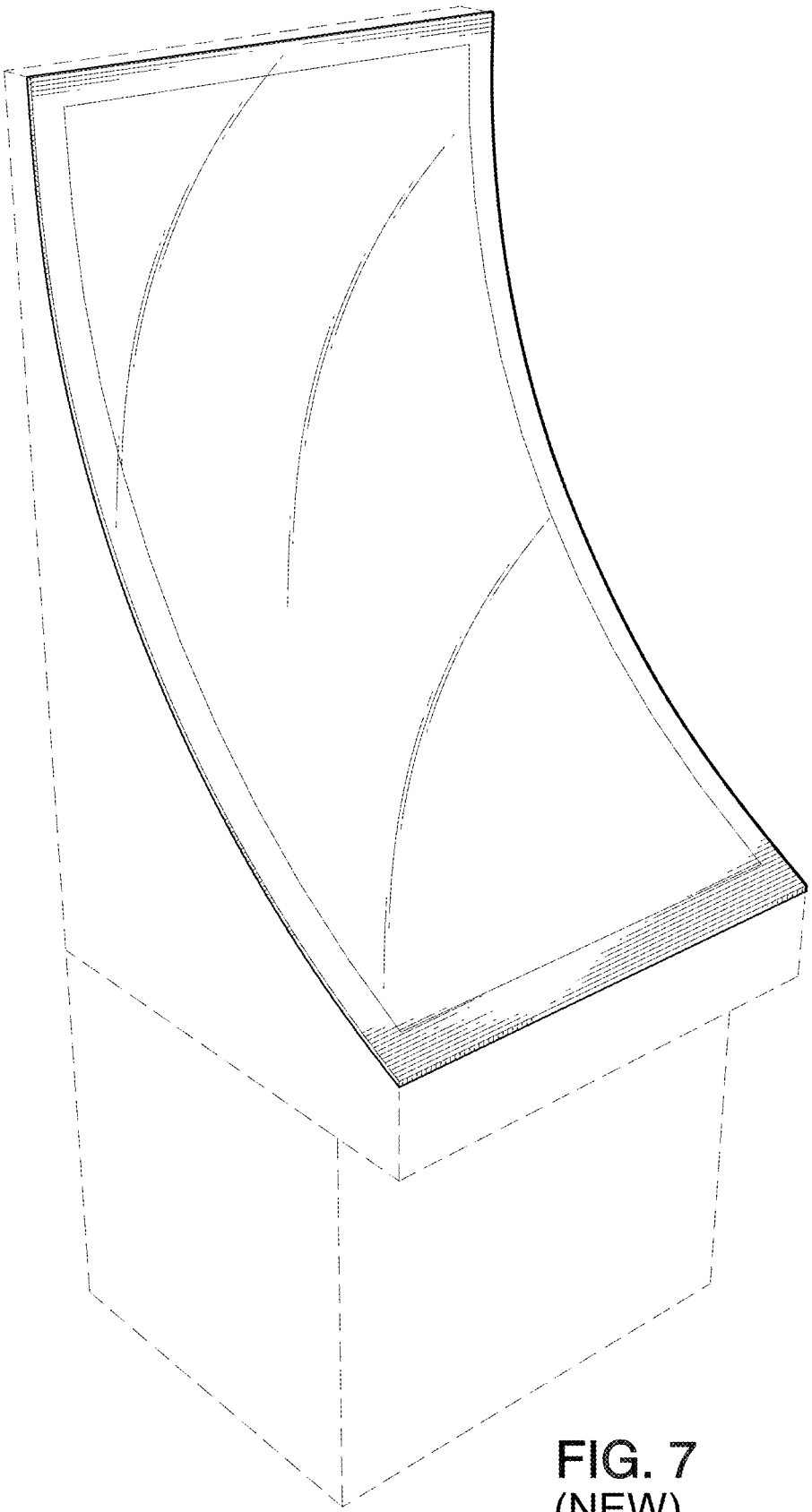
FIG. 7
(NEW)